(12) United States Patent
Foster et al.

(10) Patent No.: US 8,280,595 B2
(45) Date of Patent: Oct. 2, 2012

(54) SYSTEM AND METHOD EMPLOYING SHORT RANGE COMMUNICATIONS FOR COMMUNICATING AND EXCHANGING OPERATIONAL AND LOGISTICAL STATUS INFORMATION AMONG A PLURALITY OF AGRICULTURAL MACHINES

(75) Inventors: Christopher A. Foster, Akron, PA (US); Riccardo Morselli, Spilamberto (IT); Olivier Arnel Vanhercke, Zedelgem (BE); Guoping Wang, Naperville, IL (US); Bart M. A. Missotten, Herent (BE); Bert Juul Frans Paquet, Brugge (BE); John H. Posselius, Ephrata, PA (US)

(73) Assignee: CNH America LLC, New Holland, PA (US)

( * ) Notice: Subject to any disclaimer, the term of this patent is extended or adjusted under 35 U.S.C. 154(b) by 1086 days.

(21) Appl. No.: 12/228,370

(22) Filed: Aug. 12, 2008

(65) Prior Publication Data
US 2010/0042297 A1    Feb. 18, 2010

(51) Int. Cl.
*G06F 19/00* (2011.01)
*A01D 41/127* (2006.01)
*A01D 43/06* (2006.01)
*A01D 91/00* (2006.01)

(52) U.S. Cl. ....... 701/50; 455/466; 455/552.1; 455/557; 370/328; 370/254; 340/539.13; 340/572.1

(58) Field of Classification Search .................... 701/50; 455/466, 552.1, 557; 370/328, 254; 340/572.1, 340/539.13
See application file for complete search history.

(56) References Cited

U.S. PATENT DOCUMENTS

| | | | | |
|---|---|---|---|---|
| 5,575,316 | A | 11/1996 | Pollklas | 141/198 |
| 5,712,782 | A | 1/1998 | Weigelt et al. | 364/424.07 |
| 6,154,658 | A * | 11/2000 | Caci | 455/466 |
| 6,216,071 | B1 * | 4/2001 | Motz | 701/50 |
| 6,587,772 | B2 * | 7/2003 | Behnke | 701/50 |
| 6,664,924 | B2 * | 12/2003 | Knockeart et al. | 342/357.31 |
| 6,678,614 | B2 * | 1/2004 | McCarthy et al. | 701/440 |
| 6,682,416 | B2 * | 1/2004 | Behnke et al. | 460/114 |
| 6,732,024 | B2 | 5/2004 | Wilhelm Rekow et al. | 701/26 |
| 6,771,609 | B1 * | 8/2004 | Gudat et al. | 370/254 |

(Continued)

FOREIGN PATENT DOCUMENTS
EP    000070340    1/1983
(Continued)

*Primary Examiner* — Thomas G. Black
*Assistant Examiner* — Wae Louie
(74) *Attorney, Agent, or Firm* — Patrick M. Sheldrake

(57) ABSTRACT

A system, and method of use thereof, for enabling short range intercommunication and the exchange of logistical information between and among a plurality of authorized agricultural machines that are designed to be operable in conjunction with one another to effect, as a specific identified group, a given agricultural operation, including a plurality of individual agricultural machines each of which has a communications control portion operable to transmit and receive short distance communications signals and each of which also has authentication credentials associated therewith establishing such machine's entitlement to share in the logistical information and to be considered and treated as a member of the specific identified group involved in the performance of the given agricultural operation, with such individual agricultural machines, when positioned in range of the short distance communications signals of the individual agricultural machines, forming a peer-to-peer network in which such individual agricultural machines are joined as group members and are operable to effect the distribution over a wireless bus of the peer-to-peer network of logistical information of a group member of such network.

25 Claims, 5 Drawing Sheets

U.S. PATENT DOCUMENTS

| | | | |
|---|---|---|---|
| 6,943,824 B2 | 9/2005 | Alexia et al. | 348/89 |
| 7,032,703 B2 * | 4/2006 | Wulfert et al. | 180/329 |
| 7,158,881 B2 * | 1/2007 | McCarthy et al. | 701/443 |
| 7,173,526 B1 * | 2/2007 | Monroe | 340/521 |
| 7,212,120 B2 * | 5/2007 | Gudat | 340/572.1 |
| 7,245,216 B2 * | 7/2007 | Burkley et al. | 340/539.13 |
| 7,309,965 B2 * | 12/2007 | Dowling et al. | 315/318 |
| 7,323,970 B1 * | 1/2008 | Murray et al. | 340/426.12 |
| 7,330,117 B2 * | 2/2008 | Ferguson et al. | 340/572.1 |
| 7,366,111 B2 * | 4/2008 | Thubert et al. | 370/254 |
| 7,428,002 B2 * | 9/2008 | Monroe | 348/143 |
| 7,561,037 B1 * | 7/2009 | Monroe | 340/521 |
| 7,671,727 B2 * | 3/2010 | Flick | 340/466 |
| 7,720,026 B2 * | 5/2010 | Chen et al. | 370/328 |
| 7,738,485 B1 * | 6/2010 | Machiraju et al. | 370/458 |
| 7,796,551 B1 * | 9/2010 | Machiraju et al. | 370/330 |
| 7,812,718 B1 * | 10/2010 | Chan et al. | 340/539.13 |
| 7,813,843 B2 * | 10/2010 | Patel et al. | 701/1 |
| 7,848,278 B2 * | 12/2010 | Chen et al. | 370/328 |
| 8,059,616 B1 * | 11/2011 | Marchiraju et al. | 370/335 |
| 8,060,086 B1 * | 11/2011 | Jintaseranee et al. | 455/433 |
| 8,145,393 B2 * | 3/2012 | Foster et al. | 701/50 |
| 2002/0083695 A1 * | 7/2002 | Behnke et al. | 56/119 |
| 2005/0099265 A1 * | 5/2005 | Dix et al. | 340/5.72 |
| 2005/0275626 A1 * | 12/2005 | Mueller et al. | 345/156 |
| 2006/0014489 A1 * | 1/2006 | Fitzner et al. | 455/3.02 |
| 2006/0047418 A1 * | 3/2006 | Metzler et al. | 701/207 |
| 2007/0129869 A1 * | 6/2007 | Gudat et al. | 701/50 |
| 2009/0202109 A1 * | 8/2009 | Clar et al. | 382/104 |
| 2010/0042297 A1 * | 2/2010 | Foster et al. | 701/50 |
| 2010/0063651 A1 * | 3/2010 | Anderson | 701/2 |
| 2010/0063672 A1 * | 3/2010 | Anderson | 701/34 |
| 2010/0070145 A1 * | 3/2010 | Foster et al. | 701/50 |
| 2010/0094481 A1 * | 4/2010 | Anderson | 701/1 |
| 2010/0181964 A1 * | 7/2010 | Huggins et al. | 320/108 |
| 2010/0228470 A1 * | 9/2010 | Sakakibara | 701/200 |
| 2010/0274473 A1 * | 10/2010 | Konishi | 701/200 |
| 2011/0160919 A1 * | 6/2011 | Orr et al. | 700/283 |

FOREIGN PATENT DOCUMENTS

| | | |
|---|---|---|
| EP | 001574122 | 9/2005 |
| JP | 402242602 | 9/1990 |

* cited by examiner

SYSTEM AND METHOD EMPLOYING SHORT RANGE COMMUNICATIONS FOR COMMUNICATING AND EXCHANGING OPERATIONAL AND LOGISTICAL STATUS INFORMATION AMONG A PLURALITY OF AGRICULTURAL MACHINES

TECHNICAL FIELD

The present invention is directed to agricultural equipment, including combine harvesters and related crop transport equipment, and more particularly to a system, and method of use thereof, for communicating and exchanging operational and logistical status information, including harvesting requirements and scheduled operations, between and among the individual agricultural machines involved in a given agricultural operation, such as a harvesting operation. More specifically, the present invention is directed to a new and relatively inexpensive system and method of wirelessly intercommunicating at short distances, and utilizing short distance communication signals, on a point-to-point basis between and among such individual agricultural machines, with the individual agricultural machines positioned forming a peer-to-peer network in which they are authorized group members, and to the exchange of operational and logistical status information of such individual agricultural machines as group members of such peer-to-peer network.

BACKGROUND ART

For many years, agricultural equipment, sometimes denoted herein by the abbreviation AE, and the individual agricultural machines of such agricultural equipment, have long been operated under control of an operator thereof to perform various operations or actions, including, among other things, the harvesting of crops and the transport thereof. The performance by such agricultural equipment of the various actions has sometimes been based upon various data relating, among other things, to the individual machine being operated as well as to crop type, weather conditions, topographical conditions, and the position of the individual machine in the field from which the crop is being harvested or relative to other agricultural equipment. In addition, the status of such agricultural equipment or features or components thereof, such as, for example, the fill status of a grain bin of a combine harvester and the position of the combine harvester in a field being harvested, the load status of a crop transport and its position, especially relative to combine harvesters in a field, and the load status of a semi-trailer transporter and its location, particularly relative to the crop transports, has been considered pertinent information, which, when it can be properly shared amongst the relevant agricultural equipment, has been beneficial in the interplay and interaction of such relevant agricultural equipment as they perform a particular agricultural operation, such as the harvesting of a crop in a field and the transport of the harvested crop to storage.

In more recent years, sensors and processing devices and systems of various types have been employed to assist in the control and operation of the individual agricultural machines, and positioning systems of various designs have been developed to permit an accurate indication of the position of the individual machine within a field to be readily determined. Such sensors, processing devices, and systems have allowed equipment operators to be able to relatively quickly and easily determine the status of the equipment that they are operating at any given times, and to make use of that status information to coordinate activities with other agricultural equipment.

In part, to facilitate the coordination of activities between and among various individual pieces or machines of agricultural equipment, communications systems and devices of various types and constructions have been developed and installed on or in the individual agricultural machines so as to allow communications therebetween by the operators thereof and, in more recent years, even the communication or exchange of various data between two individual agricultural machines, typically by RF wireless communications.

In earlier systems, voice communications allowed the operator of a first individual agricultural machine to establish a communications link with and to orally communicate information, including machine location and operating information and status, to the operator of a second agricultural machine, including a different type of agricultural machine, thereby allowing the operator of the second agricultural machine to make adjustments in the operation of his or her individual machine as conditions might warrant. When the communications were between different types of agricultural machines, such as between a combine harvester and a crop transport vehicle, such communication was often intended to permit the navigation of the second agricultural machine to join or intercept the first agricultural machine, such as for the transfer of a harvested crop from the first to the second agricultural machine.

More recently, in some instances and with some communications systems, the machine operator of a combine harvester has been able to establish a communications link with and to provide data in an electronic form to a different operator or to the control system associated with the different agricultural machine, such as a crop transport vehicle, in order to permit coordination of crop transfer to the crop transport vehicle and, in some cases, to even remotely exercise some control over such crop transport vehicle, such as steerage of the crop transport vehicle to meet the combine harvester at the combine harvester's position in a field, and the scheduling of the time and location for the combine harvester and the crop transport vehicle to meet.

In other instances and with other systems, the machine operator of a crop transport vehicle has been able to receive on individual bases electronic data from one or more combine harvesters to permit the control system associated with the crop transport vehicle to coordinate the scheduling of positionings of the crop transport vehicle relative to the crop harvesters and the automated steerage of the crop transport vehicle to meet the combine harvesters at the combine harvesters' positions in a field so that coordinated transfers of the harvested crop from the combine harvesters to the crop transport vehicle can be effected.

For the most part, the electronic data so provided or received has related to the location and relative positionings of the combine harvesters and transport vehicles, with, in some instances, an operator of the combine harvester or the crop transport vehicle having the further ability to act as a master and to remotely control to some extent the navigation and/or steerage of others of the agricultural vehicles as slave vehicles in order to effect interceptions therebetween for the transfer of harvested crop from the combine harvesters to the transport vehicles.

In other instances, the electronic data has been communicated on individual bases by the individual agricultural machines to a control location distinct from both the combine harvesters and the transport vehicles, and remote operation of the combine harvesters and crop transport vehicles has been effected on individual bases from such distinct, and often significantly distanced, location.

In some situations, the control system of a slave vehicle has been so designed that, instead of, or in addition to, facilitating the steerage or navigation of the slave vehicle to effect an intercept with a master vehicle, the slave vehicle is controlled to follow, or to remain at a relatively fixed distance from, the master vehicle, based upon a continuing communication of the positioning and location information between or regarding the master and slave vehicles.

In such regards, many of the noted systems have utilized wireless RF broadcasts of the data of interest, which broadcast data has been utilized, upon receipt by another agricultural machine or a control location, for coordinating a meeting place for certain of the agricultural machines. For the most part, the patents that describe such systems address situations that involve pairs or, at most, a small number of individual agricultural machines, and sometimes a control location, and rely upon the establishment of individual broadcast/receipt communications links therebetween so that they can communicate with one another. Often, the agricultural equipment is limited to only one or two harvesters, only one or two crop transports, and/or a semi-trailer transporter or two, each of which individual agricultural machines is dedicated to a particular common harvesting operation, each of which can be linked to another of such individual agricultural machines by an individual broadcast/receipt communications link, typically an RF link, to permit communications therebetween.

In the real world, however, the unfettered broadcast, especially at RF frequencies and when over longer distances, of electronic data, and the actions by receptor agricultural equipment in responding to the receipt of such broadcast data and making use thereof, poses difficulties, especially when other, often similar agricultural equipment, perhaps engaged in harvesting a crop of a different type or under different ownership, is operating in adjacent or nearby fields or within the broadcast range of the electronic data that is so broadcast. If such other equipment is similarly broadcasting information pertinent to the particular operations that other equipment is engaged in, confusion, including as to which information is intended for which equipment groupings, may result.

The problem is exacerbated as more agricultural equipment and equipment groupings are within range of the RF broadcasts, especially if all such equipment of each of the equipment groupings is transmitting and receiving information, but with some portion of the information total intended for one agricultural grouping while other portions of the information total are intended for a second or third or fourth agricultural equipment grouping within the overlapping broadcast ranges of the individual agricultural machines. As will be appreciated, the wider the broadcast ranges of such systems and the greater the amount of information communicated thereover, the greater the probability of encountering problems.

Consequently, users of agricultural equipment have continued to seek simpler and more reliable systems and methods for communicating and exchanging operational and logistical information among the individual agricultural machines or agricultural equipment employed in performing or effecting a given agricultural operation, such as the harvesting of a crop, which systems and methods can obviate difficulties that exist or arise from the relatively indiscriminate broadcasting of information over relatively long ranges, such as may be the case with many of the systems noted hereinabove. Users wish to be able to exchange information, but recognize the problems that may arise when that information is also communicated to other non-intended equipment. Their preference is generally that pertinent information be shared with other authorized equipment without a broad dissemination of the information to extraneous, unauthorized equipment and sites.

SUMMARY OF THE INVENTION

The present invention is thus directed to a relatively simple system and method that employs short distance or short range communications signals for communicating and exchanging on a more secure basis and at short distances operational and logistical status information between and among individual authorized agricultural machines of different types involved in the performance of a given agricultural operation, with authentication credentials associated with individual agricultural machines establishing their entitlement to share in the operational and logistical status information and to be considered and treated as members of the specific identified group involved in the performance of the given agricultural operation. The system and method of the present invention employs short range communications systems that are included in or associated with the operating systems of the individual authorized agricultural machines to effect the desired distribution of status and logistical information of such individual agricultural machines to other agricultural machines that are authorized to receive such information, through a peer-to-peer wireless network between and among the authorized agricultural machines for point-to-point communications, for use by the individual agricultural machines in coordinating their activities relative to the given agricultural operation of interest.

In accordance with the present invention, each of the individual agricultural machines that is intended to be an authorized agricultural machine has an operating system that includes an operator interface portion, a sensor input portion, a master machine control, and an operation performance portion, with the master machine control operatively connected to such other noted portions. The operator interface portion includes operator input controls operable to provide operator input data to the master machine control. The sensor input portion is operable to monitor certain operational conditions, which may include the GPS position of the machine, and to provide sensor input data to the master machine control. The output performance portion is operable to effect performance of certain actions by such individual agricultural machine under control of the master machine control thereof.

Each of the individual agricultural machines also has associated therewith a communications control portion operable to transmit and receive short distance communication signals, which communications control portion is operatively connected to the master machine control of the operating system to effect communication therefrom and thereto of communications data.

In addition, in order to be considered an authorized agricultural machines, each of such individual agricultural machines has associated therewith authentication credentials that entitle such agricultural machine to membership in a specific identified group directed to the performance of the given agricultural operation.

When a plurality of such authorized individual agricultural machines are positioned relatively near to one another, to be within range of the short distance communication signals, such so authorized and positioned agricultural machines define a peer-to-peer network having a wireless communications bus accessible through the communications control portions of the individual agricultural machines to interconnect such positioned authorized individual agricultural machines for point-to-point communications.

In general, the communications control portions of the operating systems of the individual agricultural machines will typically have a baseband control formed of or including firmware and may operate as a host controller for controlling the communication of data therefrom and thereto. The communications control portions are so designed that intercommunication between and among the individual agricultural machines forming the peer-to-peer network can be effected in a manner that allows such machines to be designated or recognized as authorized members of the network entitled to participate in the exchange of data over the wireless bus of the network while restricting or inhibiting access to such data and intercommunication by other machines, such as agricultural machines in adjacent fields or third party systems. Such security can be achieved, at least in part, by the use of or adjustments in or to data protocols utilized, signal encryption, and/or restriction of the distribution range of the wireless signals.

When an agricultural machine is within range of the short distance communications signals and presents the proper credentials for recognition as an authorized machine, it will then be permitted to participate as a group member of the peer-to-peer network and to exchange status and logistical information with the other group members of the peer-to-peer network over the wireless communications bus of such network. Other agricultural machines that may be within range of the short distance communications signals of such peer-to-peer network, but which do not present the proper credentials, will not be admitted to the network as group members and/or will not be entitled to share in the exchange of information over the peer-to-peer network's wireless communications bus.

Depending upon the different types of agricultural equipment included within any agricultural system as group members of such a peer-to-peer network, certain of the individual agricultural machines may include as part of their sensor input portions sensors or monitors that, for example, detect the fill status or vehicle bin level in operational agricultural systems that include combine harvesters, tractors with grain carts, and trucks and semi-trailer transporters. Based upon such and other or additional sensor or other information, the master machine control (MMC) of a combine harvester or forage harvester may also be operable to determine an estimate of the remaining time until a full condition is reached.

Such information is typical of the information that would be included within the operational and logistical status information made available over the wireless communications bus of the peer-to-peer network. Other information that might typically be included within the operational and logistical status information would be vehicle identification and/or an operator designated label, vehicle brand and model of the vehicle, vehicle GPS co-ordinates, and operator identification, as well as such other vehicle status information as might be considered pertinent, in addition to action requests or acknowledgements or verifications or response signals produced or generated by a particular vehicle, such as upon or following the receipt of certain information by the vehicle.

With the system and method of the present invention, the operational and logistical status of the various agricultural machines within an agricultural system can thus be advantageously accessed and shared among such machines as authorized group members of a peer-to-peer network interconnected by a wireless communications bus of such peer-to-peer network for point-to-point communications over a short range. By limiting the range of the transmissions and by ensuring that only authorized group members are entitled to exchange the operational and logistical status information of the various agricultural machines in the peer-to-peer network, many of the problems that would otherwise result from information broadcasts over longer ranges and with unfettered access thereto can be lessened or minimized.

BRIEF DESCRIPTION OF THE DRAWINGS

FIG. 2 is a block diagram of various components associated with an operating system of a piece of agricultural equipment or the like.

DETAILED DESCRIPTION OF THE INVENTION

Figure 1:
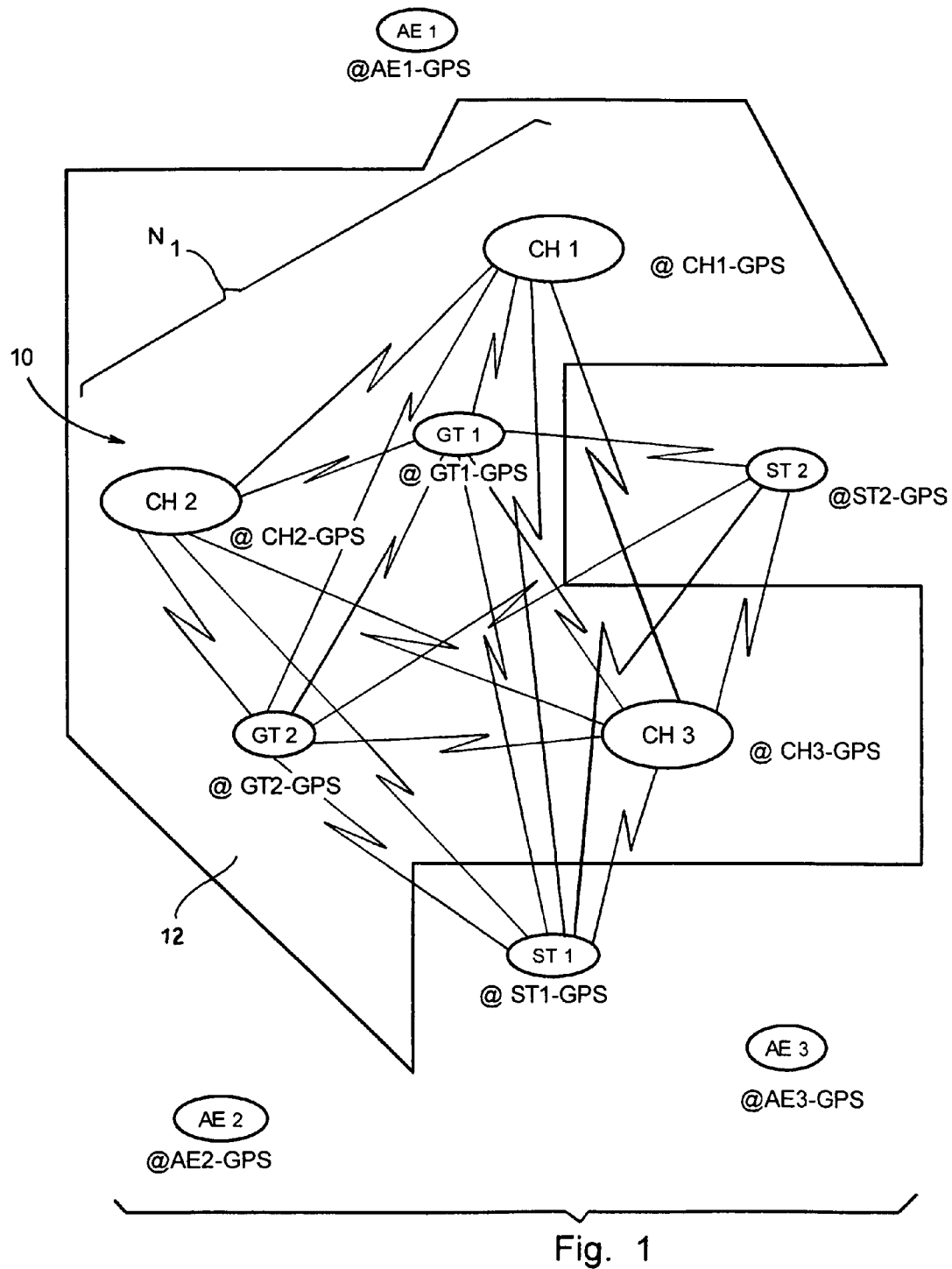
FIG. 1 is a diagram depicting a representative agricultural harvesting system that includes combine harvesters, tractors with grain transports, and semi-trailer transporters that are so positioned to define a peer-to-peer network that allows for point-to-point wireless communications over a short range between the group members of the peer-to-peer network, as well as other extraneous agricultural equipment that is not part of such peer-to-peer network due to lack of proper authentication credentials or because it is out of range of the short distance communication signals of the group members of the peer-to-peer network.

Referring now to the drawings, wherein like numbers refer to like items, FIG. 1 depicts an agricultural harvesting system 10 for harvesting a field 12, which agricultural system includes several subsets of generally like-purpose agricultural machines, such as combine harvesters CH1, CH2, and CH3, tractors with grain transports GT1 and GT2, and semi-trailer transporters ST1 and ST2, all of which machines are engaged in the harvesting of the particular crop in field 12, including the transport of such crop to storage. For convenience in future reference herein, the combine harvesters may often hereinafter be referred to more simply as harvesters, the tractors with grain transports may often hereinafter be referred to more simply as grain transports, and the semi-trailer transporters may often hereinafter be referred to more simply as transporters.

As depicted in FIG. 1, combine harvester CH1 is at location CH1-GPS, combine harvester CH2 is at location CH2-GPS, and combine harvester CH3 is at location CH3-GPS. Similarly, grain transports GT1 and GT2 are at locations GT1-GPS and GT2-GPS, respectively, and transporters ST1 and ST2 are at locations ST1-GPS and ST2-GPS, respectively.

Additional agricultural equipment AE1, AE2, and AE3 is also shown, which agricultural equipment is not engaged in the harvesting of the particular crop in field 12. Such agricultural machines AE1, AE2, and AE3 are at locations AE1-GPS, AE2-GPS, and AE3-GPS, respectively.

Figure 2:
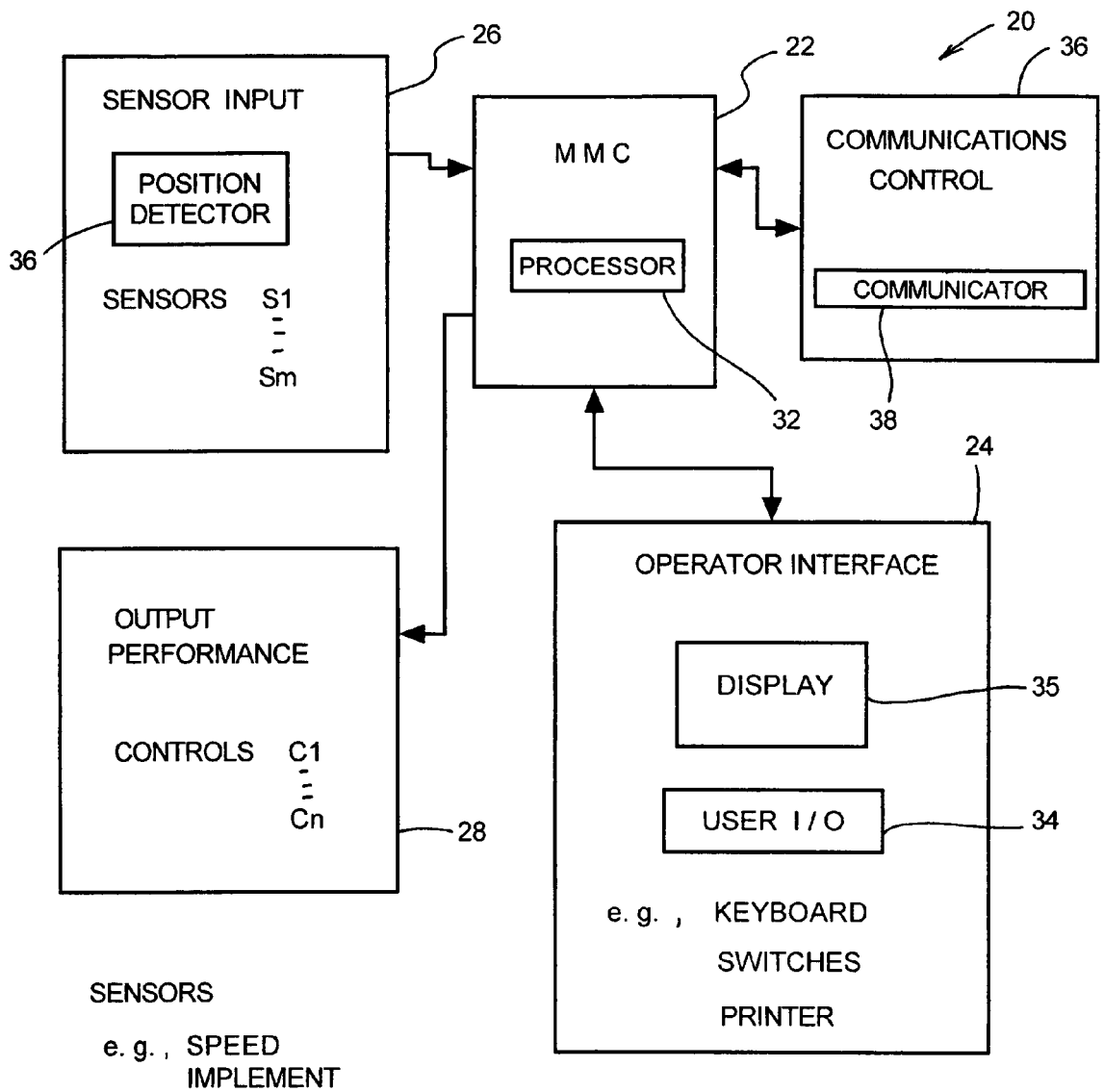

Each of such agricultural machines CH1 through CH3, GT1 and GT2, and ST1 and ST2 includes an operating system 20 such as depicted in FIG. 2, which operating system includes a master machine control (MMC) 22, an operator interface portion 24, a sensor input portion 26, and an output performance portion 28. The MMC 22 typically includes a processor portion 32, often operating under program control, variously sometimes referred to as operating system software or master machine control software or the operating software or program, that is operatively connected to the other noted portions of the operating system 20.

Operator interface portion 24 typically includes a user input/output (I/O) interface 34 that may include, by way of example and not of limitation, a keyboard for the entry of commands or other input, control switches, and printout devices, as well as a display portion 35 that may include, by way of example and not of limitation, a video display, lights, and gauges. A touch screen display, which includes features for both input and output of information, may also be advantageously employed as part of the operator interface portion 24.

Sensor input portion 26 typically includes a plurality of sensors S1 through Sm connected to monitor various conditions of the agricultural machine and of the environment in which the agricultural machine is operating. Such sensor input portion 26 also includes or has associated therewith a position sensing or determination system 36, including known systems for determining the location of the agricultural machine by global positioning, which system 36 may hereinafter sometimes be referred to as a position detector system.

The output performance portion 28 includes various operation controls C1 through Cn for controlling various operations or actions of the agricultural equipment. For a harvester, such controls C1 through Cn may, for example, include equipment and controls for setting or adjusting the harvester's speed, steerage, height of cutting or harvesting implements, distribution of crop residue, and positioning in the field, among numerous other possible actions, such as positioning of the harvester unloading device, including, by way of example, the unload tube of a combine harvester. For other agricultural equipment, such as grain transports and transporters, such controls may include various other controls. Typically, most, if not all, of such agricultural equipment will include at least speed and steerage controls, and many may also have controls for determining or updating the GPS position of the equipment and effecting communications with other equipment, including long distance communications, as will be further addressed hereinafter.

With such an operating system 20, MMC 22 is operable, based at least in part upon data and information received from the operator interface portion 24 and the sensor input portion 26, to control the operation of the agricultural machine through output performance portion 28. Control of output performance portion 28 and of the individual controls C1 through Cn thereof is effected by the establishment by processor portion 32 of various performance parameters and the use of such performance parameters in controlling the individual controls C1 through Cn.

When the performance parameters are established based primarily, if not exclusively, upon data made available through the operator interface portion 24 and the sensor input portion 26, the performance parameters are typically considered to be machine-specific performance parameters. Certain of the machine-specific parameters may change or be modified based upon inputs received from sensors S1 through Sm as the harvesting operation proceeds, while other performance parameters may remain set and unchanged.

Additionally, in accordance with the present invention, operating system 20 also includes a communications control portion 36, operatively connected to MMC 22, that serves as a gateway for the communication of data and information between MMC 22 and external sources. As will be addressed in greater detail hereinafter, such communications control portion 36 allows a user to control the wireless transmission of data and information to or the receipt of data and information from external sources, which data and information can be utilized by the equipment operator or the equipment itself to determine further actions. In some instances, MMC 22 may be responsive to receipt of data and information, especially if such data or information is provided in response to a request for such data or information submitted to the external source, to display or output the received data or information, such as by user I/O 34. In other instances, when MMC 22 is properly configured or programmed, MMC 22 may operate in response to such received data or information to effect certain actions by output performance portion 28 or changes in certain performance parameters, as a consequence of which some of the performance parameters might no longer be considered machine-specific.

As will be discussed in greater detail hereinafter, for purposes of the present invention, communications control portion 36 is specifically designed to be capable of transmitting and receiving short distance communications signals, such as, but not necessarily limited to, microwave signals associated with frequencies that often, if not typically, are in the low gigahertz range, including, by way of example and not of limitation, frequencies in the L, S, C, and X bands. The communications control portion 36 may also be capable of transmitting and receiving longer distance communications signals, including RF signals, such as might be required for GPS position determinations or for communications over RF links, but such communications control portion 36 need not necessarily be operable in such a longer distance mode for purposes of the present invention. Desirably, communications control portion 36 and MMC 22 are so constructed and configured that the short distance wireless signals transmitted by communications control portion 36 can be shared on a point-to-point basis with other authorized equipment in a peer-to-peer wireless network.

Figure 3:
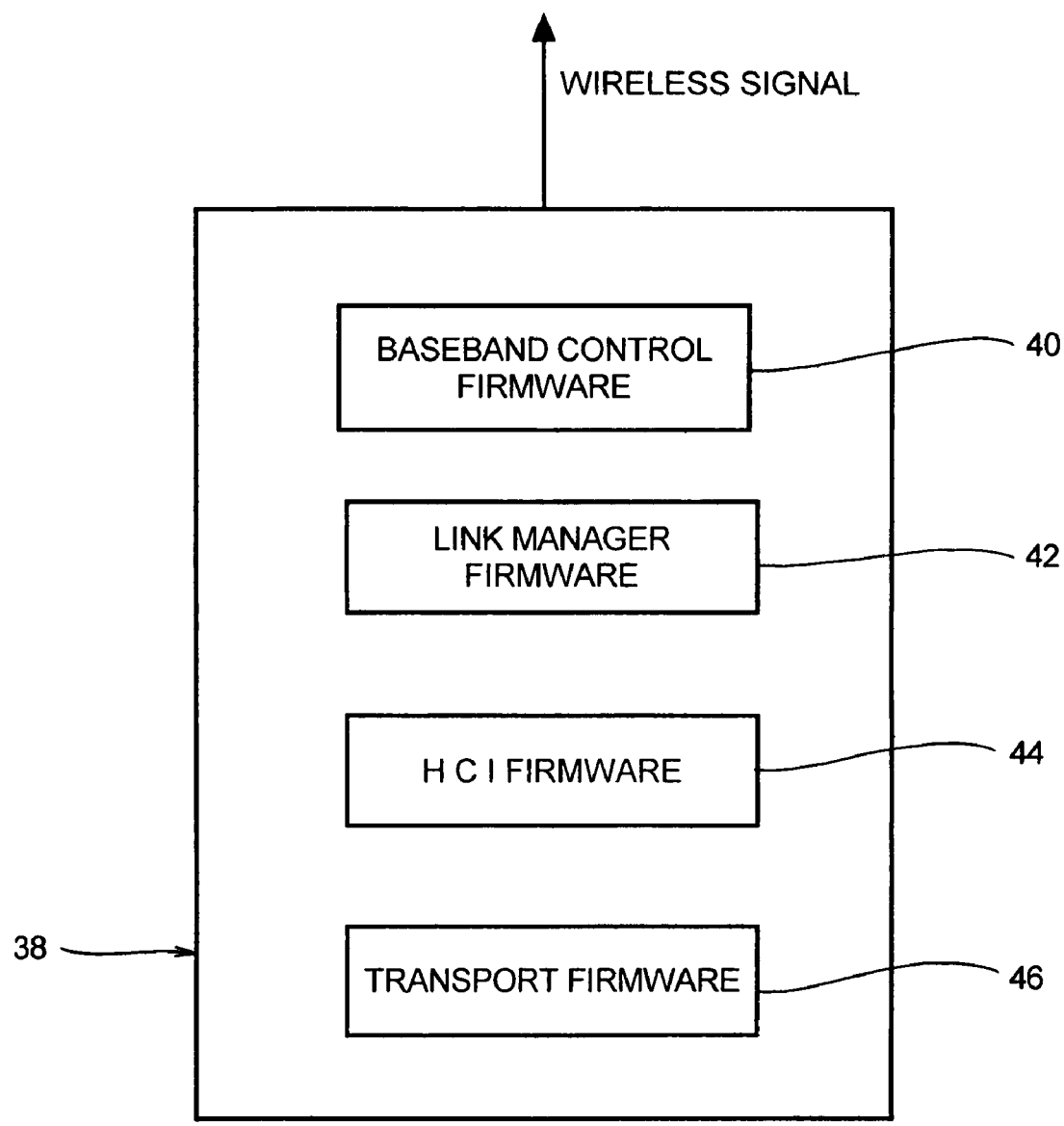
FIG. 3 is a block diagram of a typical communicator module included in the communications control portion of the operating system of an agricultural machine configured in accordance with the present invention.

FIG. 3 depicts in schematic or block form a module 38 such as may form or be included within the communications control portion 36. As presented in FIG. 3, module 38, which is hereinafter often referred to as a communicator module, is shown to include a baseband control portion 40, a link manager portion 42, a host controller interface (HCI) portion 44, and a transport portion 46. Typically, such portions include program code installed to permanently reside or be retained within or associated with hardware components, such as to be in read only memory, which program code thus is often considered to constitute firmware, but that need not necessarily be the case. Depending upon the desires of manufacturers and users, such portions may be designed and configured to include hardwired or specialty hardware components, to include hardware with installed firmware, or to include hardware with associated software, all of which configurations may be utilized to the same effect.

In accordance with the present invention, a module such as module 38 is associated with the communications control portion 36 of each agricultural machine that is to be included within the desired network Nz, where z is a reference identification number between 1 and p. Such module 38 is generally operable to transmit and receive short distance communications signals, including, but not limited to, signals made available through WiFi, Bluetooth, and ZigBee systems, and/or through the use of dedicated short range communications (DSRC), in accordance with the construction details of such module as well as certain protocols and standards, which may be determined by or included within component hardware, firmware, and software, and is preferably configured to provide or employ security features therewith, including forms of signal encryption in various instances, to permit authorized agricultural machines to be joined to a peer-to-peer network while preventing unauthorized agricultural machines from being able to join the network or to communicate with the agricultural machines of such peer-to-peer network through such network.

Figure 4:
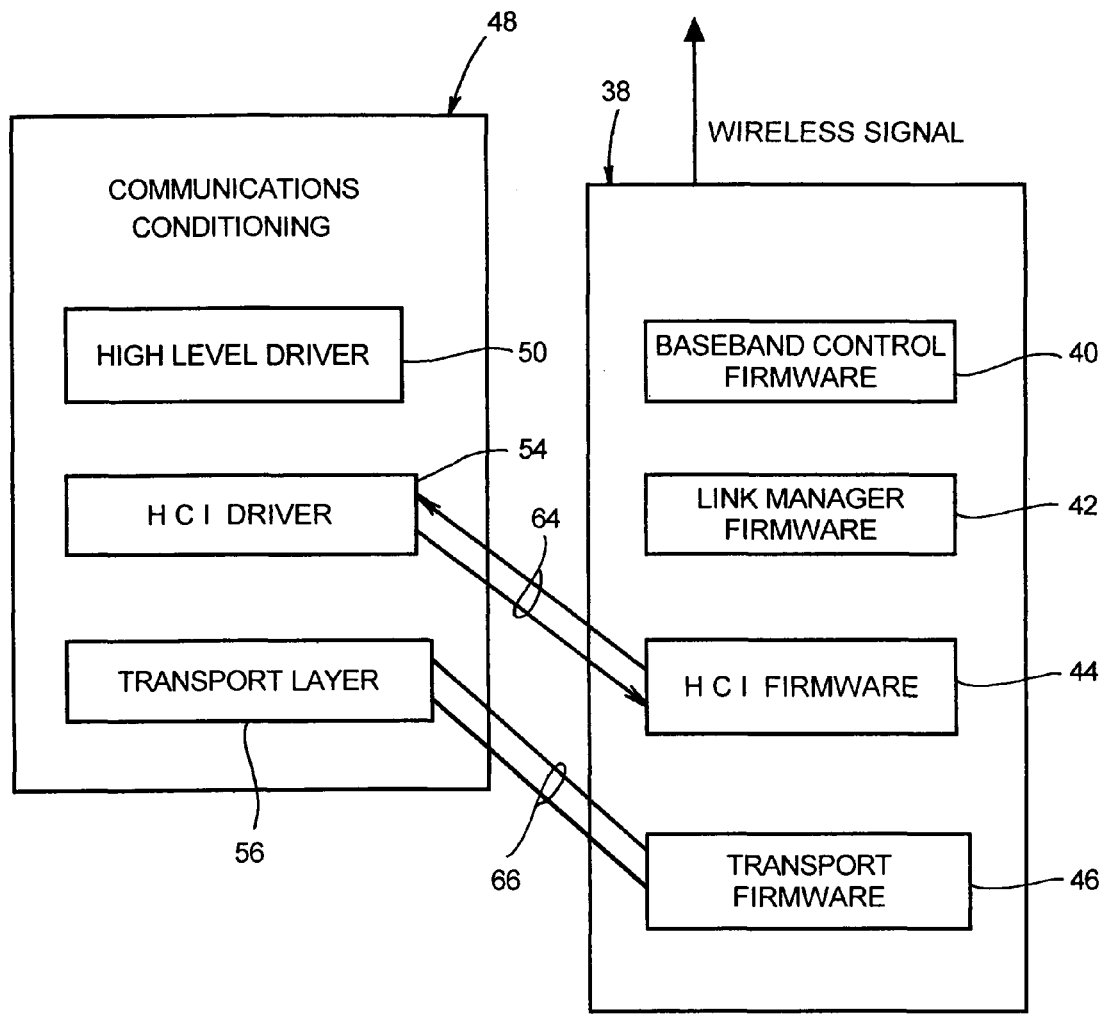
FIG. 4 is a block diagram illustrating the relationship of the communicator module of the communications control portion of FIG. 3 with a communications conditioning module of the master machine control of the operating system.

Typically, each of the plurality of agricultural machines that will be joined to the peer-to-peer network and which is to include and employ a communications control portion 36 that has a module such as communicator module 38 will also include as part of MMC 22 an associated module 48, hereinafter referred to as a communications conditioning module, that functions with communicator module 38 to control the transmission and receipt of data signals by operating system 20. In such regard, as depicted generally in FIG. 4, communications conditioning module 48 of MMC 22 may be considered to include a high level driver portion 50, a host controller interface (HCI) driver portion 54, and a transport layer portion 56. When the communicator module 38 and the communications conditioning module 48 are considered to have such general configurations, data and control interchanges may typically be considered to occur between the HCI driver portion 54 of communications conditioning module 48 and the HCI firmware section 44 of communicator module 38 and between the transport layer portion 56 of communications conditioning module 48 and the transport firmware section 46 of communicator module 38, as denoted by the interchange pairings 64 and 66. Typically, high level driver portion 50 will serve or function as a link or interface between master machine control software such as may be employed with the processor 32 and the more particularized software and firmware employed with the host controller interface driver portions and transport layer portions 54 and 56.

As will be appreciated by those skilled in the art, the communicator and communications conditioning modules 38 and 48 may take many forms and employ firmware and software designed or adapted to operate in conformity with the particular agricultural equipment (AE) with which they are employed and with the operating system software utilized in such agricultural equipment. Depending upon the particular forms of such modules 38 and 48 and the operating systems of the agricultural equipment of which they form a part, greater or lesser functional responsibilities may be distributed between the modules 38 and 48 and their component sections and portions, to the point that, in some instances, most of the firmware and software associated with the wireless communications may be subsumed within operating system hardware and software for the agricultural equipment, principally identified as being included within MMC 22, particularly where the agricultural equipment is provided by a manufacturer with an operating system that integrates to a great degree the hardware and software for the operation of such system, similar to the manner in which many personal computer systems may be provided with modem support integrated onto a motherboard and with related drivers and software included with the operating system software.

To greater or lesser degrees, the various other elements depicted in FIG. 2, may also be subsumed into such operating system hardware and software, and in some instances, position detection, including determination of a GPS position, may involve elements or portions of all of position detector 36 of sensor input portion 26, communications control portion 36, and MMC 22, especially when position detection makes use of global positioning signals.

In any event, the communications control portion 36 of operating system 20 is considered to be operable under control of MMC 22 to control the wireless signals transmitted and received by the agricultural equipment of which it forms a part. With particular regard to the present invention, MMC 22 and communications control portion 36 of operating system 20 of a particular harvester such as harvester CH1 are designed and configured and operate to be able to operatively identify other harvesters, such as harvesters CH2 and CH3, grain transports GT1 and GT2, and transporters ST1 and ST2, which are authorized to participate in a peer-to-peer network Nz with harvester CH1, labeled in FIG. 1 as network N1, and to operatively connect to such agricultural machines on a point-to-point basis. The MMCs 22 and communications control portions 36 of harvesters CH2 and CH3, grain transports GT1 and GT2, and transporters ST1 and ST2 are similarly operable to establish such point-to-point connectivity with harvester CH1 and one another. Such identification of authorized agricultural machines may utilize various name resolution and network graphing and security technologies in order to ensure that only authorized agricultural machines are recognized as participants in the peer-to-peer network and that non-joined agricultural equipment, such as agricultural machines AE1, AE2, and AE3, will be excluded from participation.

In general, each agricultural machine entitled to participate in a given secure network or group, which may be identified by a unique group name, may be required to have an identity, a unique peer name, herein represented by network labels N1, N2, and so on, and credentials that prove the ownership of such participant's identity. Oftentimes, such participants may be referred to as group members and will have credentials to prove that they are a recognized member of a particular group.

As may be observed from FIG. 1, extraneous agricultural equipment, such as AE1, AE2, and AE3 in such FIG. 1, are not included in the peer-to-peer network N1, either because they do not have the appropriate authentication credentials to entitle them to participation in the network N1 or because they are beyond the range of the short distance communications signals of the group members of the peer-to-peer network N1.

Depending upon field size and conditions, several differentiable networks having different group members could be established within different portions of a field, and certain agricultural machines could be group members of several networks or groups, as will be further addressed hereinafter.

When a plurality of agricultural machines are positioned in a field, such as at positions as shown in FIG. 1, the operators of such agricultural machines may initiate actions to identify and join in a peer-to-peer network N1 other authorized agricultural machines within range of the short distance communications signals of such agricultural machines. With a network N1 so established, the operator of an agricultural machine, such as harvester CH3, may then transmit to the group members of such network N1 information from its operating system 20 identifying such harvester, or perhaps some other agricultural machine, such as harvester CH2 or grain transport GT1, as a specimen agricultural machine whose operational and logistical information is to be presented over the wireless bus of the peer-to-peer network. Depending upon overall system design and operation, such transmission may, but need not necessarily, require acceptance acknowledgements by the other group members before recognition of the designated agricultural machine as the specimen agricultural machine.

At the instigation of an operator of an agricultural machine, data representative of the operational and logistical information of the specimen agricultural machine can then be caused to be transmitted by the specimen agricultural machine to be shared among the group members of the peer-to-peer network. Upon receipt of data transmitted from the specimen agricultural machine, other authorized agricultural machines can then determine, under either operator control or operating system control, what, if any, actions are required or may be considered desirable.

Depending upon field size and topographical conditions, it may sometimes be the case that some of the agricultural machines engaged in the common agricultural operation may be so distant from others of the agricultural machines that point-to-point communications cannot be established between all the desired agricultural machines due to the limited range of the short distance communications signals being transmitted by such agricultural machines. Under such circumstances, several point-to-point networks can be established, with each of the networks including different groupings of authorized agricultural machines, and one or more of the agricultural machines may be members of multiple networks. Operational and logistical information published on one network may be republished on a different network by an authorized agricultural machine that is a member of both networks. Extraneous agricultural machines that do not possess or which cannot present appropriate authentication credentials will not be entitled to participate in any of the peer-to-peer networks.

Figure 5:
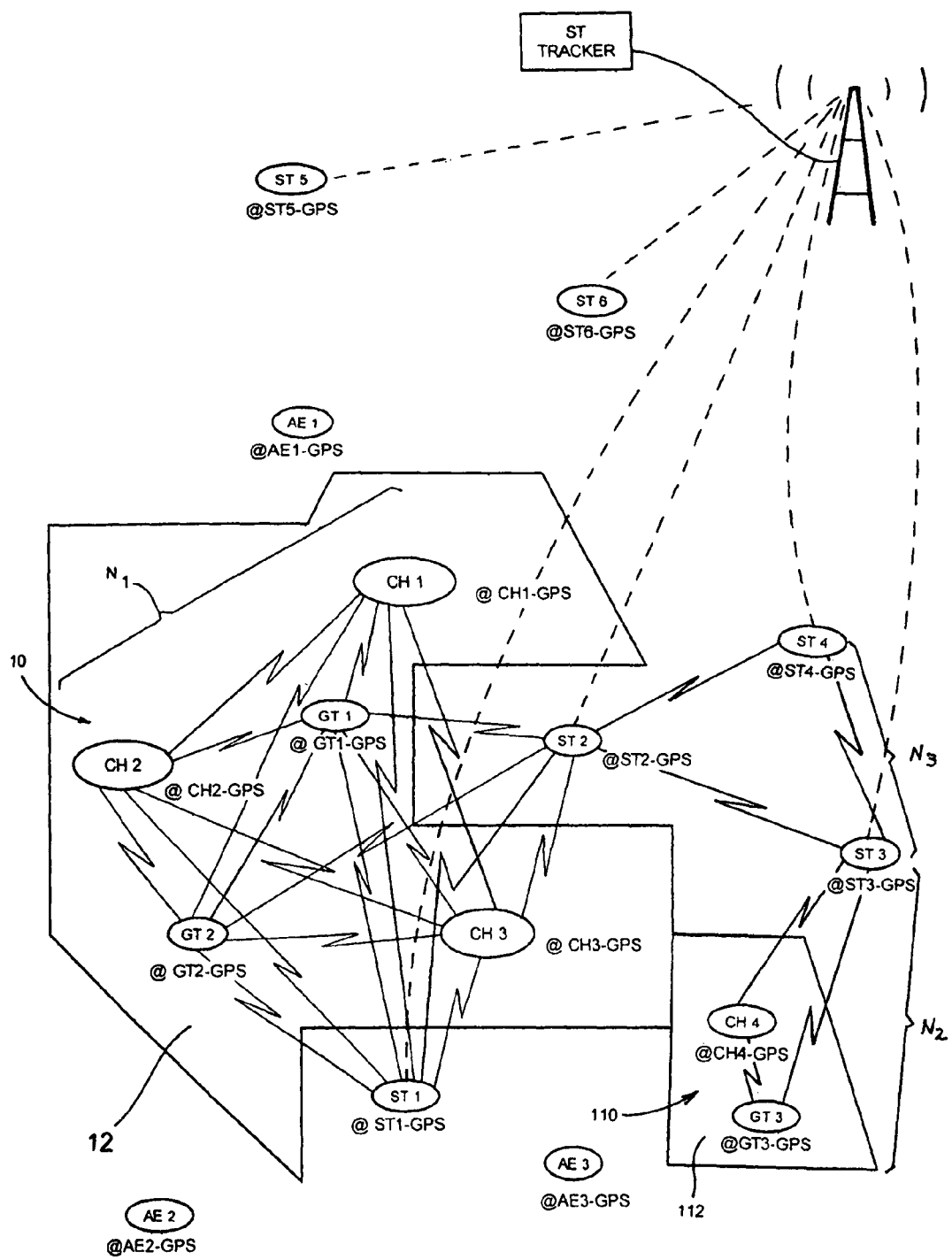
FIG. 5 is a diagram somewhat similar to FIG. 1, but depicting a larger area with a greater plurality of agricultural machines therein, with one grouping of agricultural machines forming a first peer-to-peer network N1, with a second grouping of agricultural machines forming a second peer-to-peer network N2, with the various scattered transporters being in radio communication with a transporter tracking site, and with certain agricultural equipment shown operating in independent mode, wherein certain of the transporters are members of more than one peer-to-peer network.

Certain aspects of the foregoing discussions may be evident from FIG. 5 which depicts a larger area than FIG. 1 and includes additional agricultural equipment within such larger area. In addition to the agricultural machines depicted in FIG. 1 and network N1, FIG. 5 includes an additional harvesting system 110 in an adjacent field 112, which additional harvesting system 110 includes harvester CH4, grain transport GT3, and transporter ST3, with agricultural machines CH4, GT3, and ST3 forming a peer-to-peer network N2.

Also, in FIG. 5, transporters ST2, ST3, and ST4 may be joined together in a peer-to-peer network N3. Transporter ST1, which is a group member with transporter ST2 in peer-to-peer network N1, is not a group member of peer-to-peer network N3 because it is not within range of the short distance communication signals of the group members of network N3. Similarly, transporters ST5 and ST6 are not members of any of the peer-to-peer networks because they are out of range of the short distance communication signals thereof and, perhaps, because they do not possess appropriate authentication credentials to be entitled to participation in such networks.

As may often be the case, all of the transporters ST1 through ST6 are shown as being in long distance radio communication on individual bases with a transporter tracker site, designated as ST Tracker.

Similarly, although not so indicated in FIG. 5, all of the agricultural equipment depicted may be capable of receiving transmissions from satellites or other sources for use in determining the position of such agricultural equipment, often expressed in GPS coordinates.

From the foregoing, it will be appreciated that information and data representative or indicative of the operational or logistical status of an agricultural machine can be transmitted in short distance communication signals and provided over a wireless communications bus of a peer-to-peer network to the various authorized pieces of agricultural equipment assembled in a field and that such transmitted information and data can be advantageously utilized by authorized agricultural machines receiving such data and information.

By way of example and not of limitation, among the information and data whose transmission and exchange is preferably considered desirable in many instances would be information identifying the type, make, and model of the agricultural equipment as well as an equipment identification and/or operator designated label. In some instances and with some systems, information identifying the individual operator may also be desirable. Information as to vehicle setting status is also considered desirable, as would be vehicle GPS coordinates and the fill level of the vehicle bin, which information is but a sampling of the information and data that that can be advantageously exchanged and utilized in accordance with the present invention. In addition, such transmitted information could also advantageously include items such as a harvester unload request, a grain transport response to a harvester unload request, and/or a harvester estimate of the time remaining until full, to name but a few possibilities.

Although the foregoing discussion has generally focused on mobile agricultural machines that are joined together to form a peer-to-peer network Nz in point-to-point communication with one another, it should be recognized that such network Nz may also permit the joinder and inclusion of other group members which possess or have associated therewith appropriate authentication credentials. Such other group members, which need not necessarily be constructions capable of performing agricultural operations in a field and need not be mobile, may, for example, include an authorized mobile or stationary overseer construction, which may be at a land-based site within point-to-point range of the group members of the peer-to-peer network. In such event, the overseer construction, which may have an operating system similar in many respects to the operating system 20 of the agricultural machines, could be the group member of the network that designates specimen and receptor agricultural machines and, for purposes of the present invention, may be considered to be an authorized agricultural machine even though it may not itself be capable of performing agricultural operations in a field.

Inasmuch as such an overseer construction need not necessarily be a construction capable of performing agricultural operations in a field, it need not necessarily have a sensor input portion 26 or the same type of output performance portion 28 as the agricultural machines capable of performing agricultural operations in a field and which are group members of the peer-to-peer network, but will generally have at least a MMC 22, an operator interface portion 24, and a communications portion 36 that have similar capabilities and are operably similar to those portions of the agricultural machines capable of performing agricultural operations in a field. The communications portion of such an overseer construction should be so designed to be capable of transmitting and receiving the short distance communications signals of interest.

Additionally, it should be appreciated and understood that the communications control portions 36 of the operating systems 20 of the various group members may be designed and configured to have or to operate in accordance with various technologies and standards, including, but not limited to, GPRS/GSM, Bluetooth, WiFi (IEEE 802.11 standard), WiMAX (IEEE 802.16 standard), satellite, ZigBee, DSRC, and UHF/VHF, to name but a few, but is not limited to any technology or standard, so long as the technology and standards permit or provide for point-to-point communications between the group members of the network Nz over a short range. Depending upon the technology and standards employed, as well as the particular hardware/firmware/software components, adjustments to the broadcast range of the signals may also be made available to users of the equipment. Such range adjustment or limitation, especially if coupled with various network security features, which may include various encryption techniques as well as signal hopping technologies, can be advantageously utilized to better secure the established network Nz of like-purpose agricultural machines against unauthorized intrusions or the distribution of information or data to unauthorized machines or personnel.

Furthermore, in some systems the communications control portion 36 may be designed to have or make use of different user levels for read/write and data exchange privileges, which user levels may be based upon or related to the skill level of individual machine operators or users. For example, users may be designated or identified as belonging to one of several different categories, such as Administrator, Expert, Intermediate, Novice, or Standard, with each category entitled to different privileges. With such categorization, the Administrator user may have all read/write privileges and be entitled to modify network/communication settings; the Expert user may have all read/write privileges; the Intermediate user may have limited write privileges, but full read privileges; the Novice user may have no write privileges, but full read privileges; and the Standard user may have no read/write privileges.

Especially with such systems and their communications control portions, certain users might then be able to query other vehicles to view the operational and logistical information of that other vehicle. For example, an Expert user could, based upon broadcast operational and logistical information, remotely tune the machine settings of another vehicle in the field and a Novice user could query other vehicles in the field to learn how to better tune his machine.

While the foregoing discussion has addressed the exchange of operational and logistical operation between and among combine harvesters, tractors with grain transports, and semi-trailer transporters, it should be appreciated that the invention can also be employed with other types of agricultural equipment that are operable to perform a particular agricultural operation. In such regard, those skilled in the art will thus recognize that the present invention can be used to like or similar effect with various other types of harvesters, such as cane harvesters, grape harvesters, forage harvesters, cotton harvesters, as well as with sprayers, floaters/spreaders, tractors with an air seeder or planter, and chase vehicles, to name but a few of the myriad types of agricultural equipment.

In light of all the foregoing, it should thus be apparent to those skilled in the art that there has been shown and described a system and method employing short range communications for communicating and exchanging operational and logistical information, including harvesting requirements and scheduled operations, between and among a plurality of authorized agricultural machines that are involved in a common harvesting operation. However, it should also be apparent that, within the principles and scope of the invention, many changes are possible and contemplated, including in the details, materials, and arrangements of parts which have been described and illustrated to explain the nature of the invention. Thus, while the foregoing description and discussion addresses certain preferred embodiments or elements of the invention, it should further be understood that concepts of the invention, as based upon the foregoing description and discussion, may be readily incorporated into or employed in other embodiments and constructions without departing from the scope of the invention. Accordingly, the following claims are intended to protect the invention broadly as well as in the specific form shown, and all changes, modifications, variations, and other uses and applications which do not depart from the spirit and scope of the invention are deemed to be covered by the invention, which is limited only by the claims which follow.

What is claimed is:

1. A system for enabling short range intercommunication and the exchange of logistical information between and among a plurality of authorized agricultural machines that are designed to be operable in conjunction with one another to effect, as a specific identified group, a given agricultural operation, comprising a plurality of individual agricultural machines located within a given area, each of which individual agricultural machines includes an operating system that includes an operator interface portion, a sensor input portion, a master machine control portion, and an operation performance portion, said master machine control portion operatively connected to said operator interface portion, said sensor input portion, and said operation performance portion, said operator interface portion including operator input controls operable to provide operator input data to said master machine control portion, said sensor input portion operable to monitor certain operational conditions and to provide sensor input data to said master machine control portion, said output performance portion operable to effect performance of certain actions by such individual agricultural machine under control of said master machine control portion thereof, each said individual agricultural machine also having associated therewith a communications control portion operable to transmit and receive short distance communication signals, said communications control portion operatively connected to said master machine control portion to effect the communication therefrom and thereto of communications data, said master machine control portion responsive to said data provided thereto from said operator interface portion, said sensor portion, and said communications control portion to establish operational parameters for said individual agricultural machine, at least a portion of which operational parameters define a logistical data set, each of said individual agricultural machines also having associated therewith authentication credentials entitling said individual agricultural machine to membership in a specific identified group, each such individual agricultural machine that has such authentication credentials being considered an authorized agricultural machine, said authorized agricultural machines being positioned with respect to one another to be within range of said short distance communication signals, each authorized agricultural machine operable, when in the range of said short distance communication signals, to transmit said authentication credentials of such authorized agricultural machine to establish its entitlement to membership in said specific identified group, each such authorized agricultural machine that has established such entitlement being considered an entitled agricultural machine, said authorized agricultural machines, when positioned in the range of said short distance communication signals and being entitled agricultural machines, defining and being group members in a peer to peer network that includes said specific identified group and has a wireless communications bus accessible through said communications control portions of said individual agricultural machines interconnecting said positioned plurality of individual authorized agricultural machines for point to point communications, at least one said group member of said peer to peer network being operable to identify a desired agricultural machine of said plurality of individual entitled agricultural machines as a specimen machine and to effect the transmission by said specimen machine of data representative of said logistical data set of said specimen machine over said wireless communications bus to others of said group members of said specific identified group for use thereby, whereby logistical information of an individual authorized agricultural machine of said specific identified group can be shared between and among other group members of said specific identified group but non authorized agricultural machines and agricultural machines beyond the range of said short distance communication signals will not be entitled to participate in said peer-to-peer network and to the intercommunication and exchange of logistical information with the group members thereof.

2. The system of claim 1 wherein said plurality of individual agricultural machines includes at least two sets of different types of agricultural machines, each of which sets are operable to perform different agricultural actions relative to the given agricultural operation in which said plurality of individual agricultural machines are commonly engaged.

3. The system of claim 2 wherein a first of said sets includes combine harvesters and a second of said sets includes grain transporters.

4. The system of claim 3 wherein said combine harvesters include grain bins with grain bin sensors and the fill level of said grain bin is included within said logistical data set for said combine harvesters.

5. The system of claim 3 wherein said combine harvesters and said grain transporters each include as part of said sensor input portions position determination systems for determining the position of said individual agricultural machine and said position is included within said logistical data set for said individual agricultural machine.

6. The system of claim 1 wherein said master machine control includes a processor and a control program therefor, and said operating system includes, associated with and distributed among said master machine control portion and said communications control portion, a communicator module and a communications conditioning module, said communicator module operable to control the transmission and reception of wireless communications signals by said communications control portion, said communications conditioning module operable to condition and link control and data signals provided from said master machine control portion of said operating system to said communicator portion of said communications control portion and to link and decipher control and data signals received by said master machine control portion from said communicator portion.

7. The system of claim 6 wherein said communicator portion of said communications control portion includes a baseband control portion, a link manager portion, a host controller interface portion, and a transport portion.

8. The system of claim 7 wherein said communications conditioning module includes a transport layer associatable with the transport portion of said communicator portion, a host controller interface driver portion associatable with the host controller interface portion of said communicator portion, and a high level driver portion that serves as a link between the control program for said processor and said host controller interface driver portion and said transport layer portion.

9. The system of claim 8 wherein said communications control portion includes said communicator module and said master machine control portion includes said communications conditioning module.

10. The system of claim 6 wherein said short distance communications signals are encrypted signals.

11. The system of claim 6 wherein said short distance communications signals are microwave signals.

12. The system of claim 11 wherein said microwave signals are associated with frequencies in the low gigahertz range.

13. The system of claim 6 wherein said communications control portion is configurable by a user to limit the broadcast range of said short distance communications signals.

14. The system of claim 6 wherein, for an individual machine to be treated as a group member of said peer to peer network, such individual machine must be recognized as an agricultural machine authorized to be a group member.

15. The system of claim 1 wherein said peer to peer network is a secure network and said group members thereof are required to have proper credentials to be accepted and thereafter treated as group members of said secure network.

16. The system of claim 15 wherein said communications signals are formed and transmitted by said communications control portions of said operating systems in accordance with a given protocol and said group members of said peer to peer network are operable to be able to recognize and decipher communications signals received thereby.

17. The system of claim 1 wherein said plurality of authorized agricultural machines includes a first subset of agricultural machines having a generally like purpose and generally like capabilities, and wherein said system also includes a second subset of agricultural machines having a generally like purpose different from said first subset and generally like capabilities different from the capabilities of said first subset, wherein an individual agricultural machine of said second subset, upon receipt of a logistical data set from an individual agricultural machine of said first subset, is operable to establish in such individual agricultural machine of said second subset a set of operating parameters to effect a coordinated agricultural action with such individual agricultural machine of said first subset.

18. The system of claim 1 including an overseer construction, said overseer construction including an operating system that includes at least an operator interface portion, a master machine control portion, and a communications control portion, said master machine control portion of said overseer construction operatively connected to said operator interface portion of said overseer construction, said operator interface portion of said overseer construction including operator input controls operable to provide operator input data to said master machine control portion of said overseer construction, said communications control portion of said overseer construction operatively connected to said master machine control portion of said overseer construction to effect the communication therefrom and thereto of communications data, said overseer construction also having associated therewith authentication credentials that entitle said overseer construction to membership in said specific identified group and to be considered an authorized agricultural machine.

19. A method for exchanging logistical information between and among a plurality of authorized agricultural machines that are designed to be operable in conjunction with one another to effect, as a specific identified group, a given agricultural operation, comprising providing a plurality of individual agricultural machines, each of which individual agricultural machines includes an operating system that includes an operator interface portion, a sensor input portion, a master machine control portion, and an operation performance portion, said master machine control portion operatively connected to said operator interface portion, said sensor input portion, and said operation performance portion, said operator interface portion including operator input controls operable to provide operator input data to said master machine control portion, said sensor input portion operable to monitor certain operational conditions and to provide sensor input data to said master machine control portion, said output performance portion operable to effect performance of a particular agricultural operation by such individual agricultural machine under control of said master machine control portion thereof, each said individual agricultural machine also having associated therewith a communications control portion operable to transmit and receive short distance communication signals, said communications control portion operatively connected to said master machine control portion to effect the communication therefrom and thereto of communications data, said master machine control portion responsive to said data provided thereto from said operator interface portion, said sensor portion, and said communications control portion to establish operational parameters for said individual agricultural machine, at least a portion of which operational parameters define a logistical data set, each of said individual agricultural machines also having associated therewith authentication credentials entitling said individual agricultural machine to membership in a specific identified group, each such individual agricultural machine that has such authentication credentials being considered an authorized agricultural machine, each said authorized agricultural machine being positionable relative to said other authorized agricultural machines to be within range of said short distance communication signals and, with said other authorized agricultural machines, to define a peer to peer network having a wireless communications bus accessible through said communications control portions of said authorized agricultural machines interconnecting said positioned plurality of authorized agricultural machines for point to point communications when so positioned and to be a group member of said peer to peer network, wherein a group member of said peer to peer network is operable to enable said group member to identify a desired agricultural machine of said plurality of individual authorized agricultural machines as a specimen machine and to effect the transmission by said specimen machine of data representative of said logistical data set of said specimen machine over said wireless communications bus to others of said plurality of authorized agricultural machines, such data representative of said logistical data set being considered logistical information of said specimen machine, positioning a plurality of authorized agricultural machines with respect to one another within the field to be within range of said short distance communication signals, effecting the establishment of a peer to peer network including said plurality of positioned authorized agricultural machines as group members thereof, said peer to peer network having a wireless communications bus accessible through said communications control portions of said individual authorized agricultural machines interconnecting said positioned plurality of authorized agricultural machines for point to point communications, operating a group member of said peer to peer network to effect a distribution of logistical information of a specimen machine to others of said group members of said peer to peer network, including operating said group member to identify a desired agricultural machine of said plurality of individual authorized agricultural machines as a specimen machine and to effect the transmission by said specimen machine of data representative of said logistical information of said specimen machine over said wireless communications bus to others of said group members of said peer to peer network, whereby said logistical information of said specimen machine is distributable over said wireless communications bus of said peer to peer network to thereafter be usable by said group members thereof.

20. The method of claim 19 wherein said group member operated to identify a desired agricultural machine as said specimen machine is one of said plurality of individual authorized agricultural machines and said operator interface portion thereof is operable to enable the operator thereof to identify a desired agricultural machine of said plurality of individual authorized agricultural machines as said specimen machine.

21. The method of claim 20 wherein a group member receiving said logistical information provided by said specimen machine is considered a receptor machine and the method includes operating a receptor machine to provide over said wireless communications bus of said peer to peer network an acknowledgement of the receipt of said logistical information provided by said specimen machine.

22. The method of claim 19 wherein said master machine control includes a processor and a control program therefor, said operating system includes, associated with and distributed among said master machine control portion and said communications control portion, a communicator module and a communications conditioning module, said communicator module is operable to control the transmission and reception of wireless communications signals by said communications control portion, said communications conditioning module is operable to condition and link control and data signals provided from said master machine control portion of said operating system to said communicator portion of said communications control portion and to link and decipher control and data signals received by said master machine control portion from said communicator portion, and said operation of said group member to effect a distribution of data representative of said logistical information of a specimen machine to other group members of said peer to peer network includes the operations of said communications conditioning and communicator modules to format and decipher the wireless signals on said wireless communications bus of said peer to peer network.

23. The method of claim 19 wherein said plurality of individual agricultural machines provided constitutes a first set of agricultural machines and said peer to peer network established to include said first set of agricultural machines as group members constitutes a first group network, further including the steps of providing a second set of agricultural machines that includes a second plurality of individual agricultural machines wherein said individual agricultural machines of said second set include operating systems like said operating systems of said first set and are likewise operable, said individual agricultural machines of said second set each have associated therewith authentication credentials entitling such individual agricultural machine to membership in a second specific identified group, each such individual agricultural machine that has such authentication credentials being considered an authorized agricultural machine for such second specific identified group, said individual machines of said second set of agricultural machines are positionable with respect to one another to be within range of said short distance communications signals of said second set, and, with said other individual agricultural machines of said second set, to define a second peer to peer network having a wireless communications bus accessible through said communications control portions of said second set of individual agricultural machines interconnecting said positioned plurality of individual agricultural of said second set of agricultural machines for point to point communication when so positioned and to be a group member of said second peer to peer network, at least one of said individual agricultural machines of said first set is also a member of said second set, such individual agricultural machine being considered a common set member, positioning said plurality of individual agricultural machines of said second set with respect to one another within the field to be within range of said short distance communications signals transmitted thereby, effecting the establishment of a second peer to peer network including said plurality of positioned authorized agricultural machines of said second set as group members thereof, said second peer to peer network having a wireless communications bus accessible through said communications control portions of said individual authorized agricultural machines of said second set interconnecting said positioned plurality of authorized agricultural machines of said second set for point to point communications, said group members of said second network group being operable within said second network group like group members of said first network group within said first network group, positioning said common set member to simultaneously be a group member of said first and second network groups, said common set member operable when so positioned to receive communications signals as a group member of said first network group and to relay said received communications signals to group members of said second network group.

24. The method of claim 23 wherein said operation of said group member of said first set of agricultural machines to effect a distribution of data representative of said logistical information of a specimen machine to others of said agricultural machines includes operation of said common set member to relay over said wireless communications bus of said second group network to group members of said second network group wireless signals transmitted over said wireless communications bus of said first group network.

25. The method of claim 19 wherein said short distance communications signals have a limited range generally less than the range of RF communications signals, said limited range inhibiting the broadcast of information over said wireless bus of said peer to peer network over long distances.

* * * * *